United States Patent [19]

Jayawant

[11] Patent Number: 4,859,283

[45] Date of Patent: Aug. 22, 1989

[54] MAGNESIUM IONS IN A PROCESS FOR ALKALINE PEROXIDE TREATMENT OF NONWOODY LIGNOCELLULOSIC SUBSTRATES

[75] Inventor: Madhusudan D. Jayawant, Hockessin, Del.

[73] Assignee: E. I. Du Pont de Nemours and Company, Wilmington, Del.

[21] Appl. No.: 181,776

[22] Filed: Apr. 15, 1988

[51] Int. Cl.$^4$ ................................................. D21C 9/16
[52] U.S. Cl. ........................................ 162/78; 162/90; 162/95; 162/96; 162/97; 162/99; 426/615; 426/622; 426/635; 426/636; 426/804; 426/807
[58] Field of Search ................... 162/14, 78, 99, 90, 162/95, 94, 97; 426/807, 804, 615, 622, 635, 636

[56] References Cited

U.S. PATENT DOCUMENTS

| | | | |
|---|---|---|---|
| 3,676,150 | 7/1972 | Glicksman et al. | 99/90 |
| 3,767,423 | 10/1973 | Tsantir et al. | 426/62 |
| 3,939,286 | 2/1976 | Jelks | 426/312 |
| 4,219,580 | 8/1980 | Torres | 426/549 |
| 4,237,170 | 12/1980 | Satin | 426/21 |
| 4,462,864 | 7/1984 | Carles et al. | 162/56 |
| 4,649,113 | 3/1987 | Gould | 435/165 |

FOREIGN PATENT DOCUMENTS

| | | | |
|---|---|---|---|
| 0228951 | 7/1987 | European Pat. Off. | |
| 53-143704 | 12/1978 | Japan | 162/78 |

OTHER PUBLICATIONS

Schumb et al., *Hydrogen Peroxide*, ACS Monograph Series, Chapter 9, pp. 515–547 (1955).

Gould, *Biotechnology and Bioengineering*, vol. 27, pp. 225–231 (1985)—"Studies on the Mechanism of Alkaline Peroxide Delignification of Agricultural Residues".

*Primary Examiner*—Peter Chin
*Attorney, Agent, or Firm*—Craig H. Evans

[57] ABSTRACT

An improved process for delignifying and bleaching nonwoody, lignocellulosic material into products digestible by ruminants and ingestible by humans. The process comprises treating the substrate in an alkaline solution for a period of time and adding magnesium ions prior to adding peroxide or, alternatively, adding the magnesium to the peroxide prior to adding the peroxide to the alkaline slurry.

29 Claims, No Drawings

MAGNESIUM IONS IN A PROCESS FOR ALKALINE PEROXIDE TREATMENT OF NONWOODY LIGNOCELLULOSIC SUBSTRATES

FIELD OF INVENTION

This invention relates to an improved alkaline peroxide treatment process for delignifying and bleaching nonwoody lignocellulosic agricultural residues, and more particularly to such a process for converting such residues into cellulosic fiber products suitable as a source of both reduced calorie dietary fiber for human consumption and carbohydrates for ruminant and microbe consumption.

The reduced calorie dietary fiber is characterized by high dietary fiber content and low contents of proteinaceous, fatty and ash-forming materials. It is suitable as a substitute for farinaceous flour at high replacement levels.

BACKGROUND

Various processes are known for converting woody and nonwoody lignocellulosic substrates into fibrous products suitable for ingestion by animals and humans.

Cattle, sheep and other ruminants are able to digest and grow on many kinds of cellulosic plant materials that provide little or no nourishment to humans and other monogastrics. Even the ruminants, however, have limited ability to efficiently digest lignocellulosic materials such as the leaves and stalks of grain-bearing grasses and the husks and hulls of the grain. This low conversion efficiency has been attributed to the close association of lignin with the cellulosic and hemicellulosic fibers in these materials. This lignin makes these cellulosics largely unavailable for digestion by the digestive juices and the microbes that inhabit ruminant stomachs. (See Jelks, U.S. Pat. No. 3,939,286 and Gould, U.S. Pat. No. 4,649,113).

Human inability to digest and assimilate cellulose and hemicellulose makes the substrates attractive as potential sources of dietary fiber. But, widespread use for this purpose has been hampered by the lignin that envelops the cellulosic fibers, by the highly crystalline character of the fibers and by the presence of components such as fatty substances (fats and oils) and ash-forming substances (including silicaceous materials). The crystalline character imparts undesirable physical properties to foodstuffs and the fatty and ash-forming substances, especially when used in relatively high proportions, adversely effect the aroma, taste, texture and mouth feel of food products.

One lignocellulosic material used as a dietary fiber is bran, the unbleached coarse outside covering of the seeds or kernels of cereal grains. Bran is used as fiber or roughage in some breakfast foods, breads and muffins. But, most of the bran is used in animal food, primarily because its high non-cellulosic content adds undesirable properties to many kinds of baked goods, particularly to white bread.

Low calorie flour substitutes made by grinding hulls of oats and other cereal grains (see Tsantir et al., U.S. Pat. No. 3,767,423) contain relatively large proportions of non-cellulosic components such as ash-forming substances. At desirably high flour replacement levels, food products in which they are used have a gritty aftertaste. For this reason, commercial interest has shifted largely to purified cellulose as a dietary fiber for human consumption.

Two forms of purified cellulose, both derived from wood products, are currently available. They are crystalline alpha cellulose, sold under the trade name "Solka-Floc", and microcrystalline cellulose, derived from alpha cellulose, sold under the trade name "Avicel". These products, however, are not entirely satisfactory as flour substitutes (See Glicksman et al., U.S. Pat. No. 3,676,150; Satin, U.S. Pat. No. 4,237,170; Tsantir et al., U.S. Pat. No. 3,767,423; and Torres, U.S. Pat. No. 4,219,580). The taste and texture of baked goods is adversely effected at flour replacement levels greater than about 20 percent.

Gould, U.S. Pat. No. 4,649,113 (1987), discloses a process (Gould Process) for converting nonwoody lignocellulosic agricultural residues (substrate) such as wheat straw into cellulosic fiber products digestible by ruminants and microbes. Gould et al., European Patent Application No. 228951 (1987), discloses that the delignified fiber products of U.S. Pat. No. 4,649,113 are also suitable as noncaloric fiber additives to compositions intended for consumption by humans.

The Gould Process involves slurrying the substrate in aqueous hydrogen peroxide ($H_2O_2$) and alkali (NaOH) at a pH of 11.2 to 11.8 and a temperature of 5° to at least 60° C. The substrate is sufficiently delignified exposing virtually all the cellulosic carbohydrates. During the alkaline peroxide treatment, the pH of the reaction medium drifts upward and is controlled by the addition of acid. The $H_2O_2$ assists in the delignification of the substrate by oxidizing and degrading lignin to low molecular weight water-soluble compounds, principally carboxylic acids.

Gould et al. teaches that the products can serve as wheat flour substitutes at high (30% or more) replacement levels.

Although attractive as a means of converting substrates to food formulations for ruminants and humans, the Gould Process is not entirely satisfactory for commercial use. It requires rather high concentrations of both $H_2O_2$ and NaOH based on the substrate (based on the examples, at least 25% by weight of each) and suffers high losses of $H_2O_2$ through nonfunctional (nonproductive) decomposition to oxygen gas ($2\ H_2O_2 \rightarrow 2\ H_2O + O_2$). Also, we have found that the process when used to treat difficult substrates such as oat hulls results in a rapid decrease in the concentration of the $H_2O_2$, accompanied by excessive initial foaming of the reaction mixture, and the production of products that have undesirable quality (brightness, taste and aroma) for human consumption.

Decomposition of $H_2O_2$ in a highly alkaline heterogeneous reaction medium, such as when a particulate substrate is present, is not too surprising for a couple of reasons. First, $H_2O_2$ is known to be unstable in alkali, particularly at high pH. Second, heterogeneous $H_2O_2$ decomposition into $H_2O$ and $O_2$ (catalyzed by solid surfaces) is generally far faster than homogeneous decomposition (catalyzed by a variety of soluble, mostly cationic substrates), with the rate increasing in proportion to the surface area of the solids (see Schumb et al., *Hydrogen Peroxide*, ACS Monograph Series, New York, Rheinhold (1955) pp 521–522).

In a copending application to Jayawant (CH-1459) assigned to E. I. du Pont de Nemours & Company, an improvement over the process taught in U.S. Patent No. 4,699,113 is taught for converting nonwoody substrates, particularly nonwoody lignocellulosic agricultural residues, into cellulosic fiber products useful as a source of carbohydrates digestible by ruminants and as a source of low calorie dietary fiber ingestible by humans. The process broadly comprises treating lignocellulosic substrates in an aqueous solution of strong alkali (Alkaline, Peroxide-Free Stage) for a period of time prior to the addition of peroxide (Alkaline-Peroxide Stage). Both the copending application (CH-1459) and U.S. Patent No. 4,649,113 are incorporated herein by reference.

BRIEF DESCRIPTION OF THE INVENTION

It has now been found that by incorporating magnesium ions in the Alkaline, Peroxide-Free Stage of the copending application to Jayawant (CH-1459) that the following benefits result:

(a) a further decrease in the consumption of peroxide;
(b) reduction in rancid odor;
(c) increased removal of silica known to impart grittiness to products containing it; and
(d) brighter, whiter product, important in a flour substitute for white bread and other lightly colored baked goods.

The delignified and bleached cellulosic fiber products are suitable flour substitutes since they are high in dietary fiber, substantially free of nutritive proteinaceous and fatty components, and ash-forming, expecially silicaceous, components. They can be used as farinaceous flour substitutes in replacement concentrations exceeding 20 percent by weight of the flour. The foods made from the resulting flour have good aroma, texture and mouthfeel.

DETAILED DESCRIPTION OF INVENTION

The invention comprises an improved process for converting a nonwoody lignocellulosic material (Substrate) into products digestible by ruminants and ingestible by humans. The process comprises the following steps:

(a) forming a slurry of the substrate with aqueous alkali in an amount at least sufficient to wet the substrate, the slurry having a pH in the range 10 to 13 and a temperature of 25° to 100° C., the slurry being substantially free of peroxide (Alkaline, Peroxide-Free Stage with Magnesium Ions);

(b) maintaining the slurry for a sufficient time under conditions of (a) for the alkali to wet the substrate;

(c) adding sufficient magnesium compound to provide about 0.5 to 1.0%, preferably 0.1 to 0.8 percent, more preferably 0.2 to 0.6 percent magnesium ions based on the dry weight of the substrate;

(d) adding sufficient water-soluble peroxide to the alkaline slurry after the addition of the magnesium ions to bleach the substrate (Alkaline-Peroxide Stage);

(e) maintaining the substrate in contact with the alkaline peroxide solution at a temperature and for a time sufficient to produce a substantially bleached, cellulosic fiber (Product); and (f) separating the Product from the alkaline liquid (Separation Stage).

The magnesium compound in step (c) may be added to the Alkaline, Peroxide-Free Stage or, alternatively, may be added by dissolving or dispersing the magnesium compound in the water solution of the water soluble peroxide compound which is added in step (d).

For the production of ruminant feedstuff supplements, it is only necessary to sufficiently delignify the substrate to expose substantially all the cellulosic and hemicellulosic components. The presence of residual proteins, fats, oils and ash-forming substances are of little consequence in the production and acceptability of such feedstuff supplements.

For human dietary fiber products, in addition to removal of lignin, removal of residual nutritive proteins, fats, oils and ash-formers is important. Reducing the nutritive content is needed if the product is to qualify as "dietary", that is, as a low calorie or non-fattening food. Reducing fats, particularly unsaturated fats, is needed to avoid objectionable aroma and a rancid odor in baked goods. Reducing the ash-forming substances is needed to avoid objectionable mouthfeel (gritty taste and texture) in baked goods. The Substrate The substrate is a nonwoody lignocellulosic material, preferably an agricultural residue. Agricultural residue includes those portions of grassy plants of the family Gramineae remaining after harvesting. Typically, leaves and stalks and the husks and hulls of grain remain after harvesting.

The substrate can be a straw such as barley straw, flax straw, oat straw, rice straw, rye straw and wheat straw. It can be the corn stalks, corn cobs and corn husks. It can be bagasse, the portion remaining after the harvesting of sugar cane. It can be the hulls of cereal grains such as barley, oats and rice. It can also be other nonwoody lignocellulosic materials such as grasses not normally cultivated for agricultural purposes.

The cereal grain hulls, oat hulls in particular, are preferred for making low-calorie flour substitutes because of the general acceptance of the cereal grains as foods for humans.

Hulls generally have a high fatty substance or oil content and a high ash-forming or silica content whereas both straw and bagasse have a low oil content, but a high silica content.

Oat hulls and the hulls of other cereal grains are composed largely of cellulose (25–30 wt. %), hemicellulose (45–50 wt. %) and lignin (6–11 wt. %). They also contain proteins (36–6 wt. %), fatty substances (1–2.5 wt. %), ash-forming components (3–6 wt. %, about ⅓ of which is silicaceous, calculated as $SiO_2$) and moisture (3–9 wt. %).

Straw typically has 70 to 75% cellulose, 30 to 40% hemicellulose, 15 to 18% lignin, 4 to 12% ash-forming substances, and 5 to 10% moisture. Typically straw has a low fat content as evidenced by the ether extractable fraction that is about 1 to 1.5 percent.

Bagasse typically has 63 to 70% cellulose, 25 to 33% hemicellulose, 18 to 22% lignin, 2 to 6% ash-forming substances, and 5 to 13% moisture. Typically bagasse has a low fat content as evidenced by the ether extractable fraction that is less than about 1 percent.

The substrate may in many cases be used as it comes from the field or may be subjected to one or more preparatory steps.

It is preferably cleaned by cold or hot water or by steam washing to remove foreign matter and debris. Hot water or steam washing or steaming also deactivates biological or enzymatic hydrogen peroxide decomposition catalysts such as catalase and helps in solubilizing water-soluble inorganic salts or hydrogen peroxide decomposition catalysts, and organic sugars, acids and oxidizable compounds found in some substrates.

It is preferably comminuted, as by chopping, shredding or grinding, to increase its surface area and facilitate subsequent treatments with alkali and alkaline peroxide. It is particularly preferred, however, to avoid grinding the substrate too fine, since filtration, handling and drying problems result and yield loss increases. Therefore, comminution is most preferably by chopping or shredding. Comminuted substrates tend to yield brighter bleached products if residual liquid can be effectively removed from the substrate. If the substrate is ground too fine, high efficiency separation such as by centrifugation is needed to effectively remove liquid. High brightness is desired in flour substitutes for use in baking white bread. Fine grinding of the dried, bleached product is preferred if the product is to be used in low-calorie food.

ALKALINE, PEROXIDE-FREE STAGE WITH MAGNESIUM IONS

This invention resides in the introduction of magnesium ions to the Alkaline, Peroxide-Free Stage. Preferably the magnesium ions should be added after the alkali has wetted the substrate. The magnesium ion can be added with the peroxide in dissolved form in the next stage.

The source of such ions may be any biologically safe magnesium compound such as the chloride, sulfate, hydroxide, oxide, carbonate acetate, citrate, tartarate gluconate or the like. Preferably, the magnesium compound is water soluble and more preferably is magnesium sulfate ($MgSO_4$) or magnesium chloride ($MgCl_2$).

The concentration of magnesium ions in the slurry of the substrate in aqueous alkali in the absence of peroxide should be about 0.5 to 1.0 percent of the weight of the dry substrate. Preferably, the concentration should be 0.1 to 0.8 percent, and more preferably it should be 0.2 to 0.6 percent.

Peroxide is added to the slurry after the substrate is held for a time at a temperature and conditions that assure uniform wetting of the substrate in this first stage.

Preferably, the substrate is first slurried in water and then sufficient alkali is added as a concentrated aqueous solution to provide the desired pH.

Sufficient alkali is about 5 to 15% alkali metal base, calculated as NaOH, based on the dry weight of the substrate, preferably 8% to 12% and more preferably around 10%.

The pH of the alkaline slurry in the absence of peroxide should be about 10.0 to 13.0, preferably about 10.2 to 11.8, more preferably 10.8 to 11.2.

The alkali is an alkali metal base, preferably a hydroxide or carbonate of sodium or potassium and more preferably NaOH. The alkali or its concentrated solution (40–50 weight %) can be added all at once or in increments, as may be needed, to maintain the desired pH throughout the alkalization of substrate in the absence of peroxide.

The consistency of the slurry (weight percent dry substrate in the slurry) is not critical so long as the slurry is stirrable. Preferred consistencies are about 5% to 30% and more preferably about 10% to 20%. In general, higher consistencies may be employed if the substrate is comminuted.

The slurry preferably is stirred in any conventional stirring apparatus such as pipeline mixers, blenders, agitated vessels or recirculating pumps, to assure full and uniform wetting. Full and uniform wetting is indicated by the substrate becoming evenly dispersed and non-buoyant in the slurry.

The temperature for alkalizing the substrate in the absence of peroxide can vary broadly, say, about 25° to 100° C., but preferably will be about 60° to 75° C. and, more preferably, about 65° to 70° C.

The duration of this alkalizing phase may range from a few minutes to an hour or more depending on the temperature and mixing efficiency; in general, the higher the temperature the shorter the time of treatment required. At 65° to 70° C., the substrate is preferably maintained in contact with the aqueous alkali under normal agitation for 5 to 30 minutes, more preferably 15 to 30 minutes. If a higher efficiency mixer, such as a blender, is used, shorter times will be needed to fully and uniformly wet the substrate.

THE ALKALINE-PEROXIDE STAGE

Sufficient peroxide is added to the aqueous alkaline slurry from the first step of treatment to delignify and bleach the substrate. The concentration of the peroxide in the alkaline substrate slurry can vary broadly but preferably is about 1% to 15% of the original dry weight of the substrate, preferably 3% to 10% and more preferably about 5% to 8%.

The magnesium compound may be added simultaneously but separately with aqueous peroxide solution.

The magnesium compounds may, as another alternative to being added to the Alkaline, Peroxide-Free Stage, be dissolved or dispersed in aqueous peroxide solution which is added to the aqueous alkaline slurry from the first step. The $Mg^{++}$ ion concentration should be such that when added to the alkaline slurry, the concentration is about 0.05 to 1.0 percent, preferably 0.1 to 0.8 percent and more preferably 0.2 to 0.6 percent of the dry weight of the substrate.

There is no upper limit to the amount of Mg compound that can be added. However, above about 1% $Mg^{++}$ concentration, there will be little further benefit, and the amount would be uneconomical.

The peroxide may be any water-soluble peroxide, such as hydrogen peroxide, sodium peroxide, sodium percarbonate, or other peroxide hydrolyzable in aqueous alkali to form $H_2O_2$ or its conjugate base, the hydroperoxide anion $HO_2-$ and peroxy acids such as peroxyacetic acid and monopersulfonic acid. $H_2O_2$ is preferred for its ready availability as a concentrated aqueous solutions, 35–70% by weight, and its ease of handling. If other than hydrogen peroxide is used, the total amount of alkali needed should be adjusted to account for the "alkali" content of the peroxide.

As $H_2O_2$ (pKa 10.8) is a stronger acid than $H_2O$ (pka 14), its addition to the alkaline slurry decreases the pH of the slurry. Also, the pH decreases as hydroxide ion is consumed in neutralizing the carboxylic degradation products derived from lignin to carboxylate ions and in hydroyzing proteins, saponifying fats and oils to carboxylate ions since carboxylate ions are substantially weaker bases than hydroxide ion. Accordingly, the pH should be adjusted, as needed, by the addition of alkali, to maintain a pH of about 9.5 to 11.0, preferably about 10.0 to 10.5.

The total alkali, taken as NaOH, required in the overall process (both Alkaline, Peroxide-Free and Alkaline Peroxide Stages) will generally not exceed 15% of the original dry weight of the substrate.

The reaction mixture is preferably agitated at a sufficient temperature and time to produce a substantially delignified and bleached cellulosic fiber product.

Agitation of the slurry is in any conventional stirring apparatus, such as pipeline mixers, blenders, agitated vessels or recirculating pumps.

The temperature for alkalizing the substrate in the presence of peroxide can vary broadly, say, about 25° to 90° C., but preferably will be about 50° to 85° C. and, more preferably, about 60° to 80° C.

Reaction time can be as short as ½ hour and as long as 24 hours, depending on the temperature. Typical time-temperature combinations are 1–3 hours at 65°–85° C., 3–6 hours at 50°–60° C. and 15–24 hours at room temperatures.

When the cellulosic fiber product is to be used as a low calorie dietary fiber, reaction time at a given pH should be long enough, not only delignify, but to substantually hydrolyze and remove the proteinaceous, fatty and silicaceous constituents from the substrate.

Removal of lignin, proteins, fats and oils, silica and other ash-forming substances can be determined during or after the process by direct analysis using standard methods known in the art. Delignification can also be determined indirectly by measuring the quantity of material removed and solubilized in the aqueous phase. In general, the yield loss amounts to about 25% to about 37% of the original dry weight of the substrate.

To reduce the silica content to less than 1% by weight of the product in a reasonable period of time, say 1–6 hours, the pH should be at least about 10.0, preferably 10.4 or greater but not greater than about 11.8 throughout the reaction, the latter to avoid solubilizing hemicellulose. The temperature should be 25° to 90° C., preferably 50° to 85° C., and more preferably 60° to 80° C. Lower ash results when higher temperatures and shorter treat times are used. Brightness and peroxide efficiency is sacrificed if the temperature is too high.

SEPARATION OF PRODUCT

Upon completion of the alkaline peroxide treatment, the insoluble cellulosic fiber product is separated from the aqueous alkaline phase, washed with water one or more times to remove alkali metal base and water-soluble compounds, neutralized as needed with any aqueous aqueous mineral acid or organic acid that is non-toxic, such as hydrochloric, nitric, sulfuric, citric, tartaric and acetic acid, rewashed with water and, if desired, dried.

Preferably, the total ash-forming content should be less than 2.5% and, more preferably, less than 2% by weight; the silica content should be less than 1%. The total ash of the recovered product depends mainly on the residual silica content and the alkali metal ion retained within the fibers of the product. Therefore, thorough washing is preferred to ensure the substantially complete removal of water-soluble inorganic content.

The separated product preferably is dried in a conventional drier such as a rotary drier, a fluid bed drier, a pan drier or a spray drier. More preferably, the product is dewatered, for example, by pressing or centrifuging prior to drying. Drying temperatures depend on the type of drier but should be high enough to efficiently dry but low enough to avoid charring or darening the product. Preferably product temperature should not exceed 105° C.

PRODUCT

The dried product can be ground for use as a dry ruminant feedstuff or dietary fiber for substitution at high replacement levels as flour used to make cakes, breads, pasta, pizza and other baked goods for human consumption.

Particularly in the case of dietary fiber, the product of this invention is preferably fine ground by itself or co-ground with the regular grain or flour with which it ultimately is to be mixed. Regular flour can be any flour such as wheat flour, corn flour, rice flour, rye flour or oat flour and need not be from the same plant as the fiber of this invention. Cogrinding or milling with grains such as rice, corn, wheat, barley, oat, rye, etc. may be done after a preblending operation, to give a uniformly distributed mixture of regular flour and the dietary fiber flour of this invention.

In preferred embodiments of the invention, flour substitutes having low levels (in weight %) of proteins (less than 1), fatty substances (less than 0.1) and ash-forming substances (less than 2.5) including the silicaceous material, taken as $SiO_2$, (less than 1) are produced.

In preferred embodiments of the invention designed to provide bleached cellulosic fiber products for use as low calorie dietary flour substitutes, the degree of whiteness of the bleached product, or its brightness value, should be high to meet the demands of the white flour industry. The brightness, as determined with a Hunter Color Difference Meter, Model D-2, of the dry product tamped flush with the rim of a round 6 cm diameter × 1.8 cm deep metal can, should be at least about 75, preferably about 80 or more. In comparison, the unbleached substrates have brightness values around 65 or less.

EXAMPLES

The following examples are intended only to further illustrate the invention and are not intended to limit the scope of the invention. Suitability of the product for use as a flour substitute ultimately is determined by bake tests. The products from the examples were submitted for such tests which were run according to the following procedure:

1. The product was mixed with wheat (white bread) flour at a 40 weight percent replacement level.
2. Bread was made under standard baking conditions.
3. A "Score" was determined by trained laboratory personnel in the baking laboratory. They evaluated the loaves for loaf volume, external color, crumb color, break and shred, aroma, taste, mastication, grain presence, texture, and symmetry. Each criteria is given a point value. The total point value for all the criteria is 100. For comparison, white bread made with unmodified regular flour under standard baking conditions typically receives a score of about 90.

EXAMPLE 1

A. Clean rolled (flattened) oat hulls (249.5 grams) having a moisture content of 9.84% were added to 2000 grams of DI water under agitation at 75° C., followed by 75.9 grams of 29.64% aqueous NaOH, providing 10% NaOH based on the dry weight of the hulls. The slurry was stirred for 15 minutes at a pH=11.15. Hydrogen peroxide (37.2 grams of 30.25% aqueous $H_2O_2$) were then added to provide 5% $H_2O_2$ based on the dry weight of the hulls. The slurry was stirred for 2 hours at 75° C. The final pH was 9.80. The insoluble fraction was recovered by filtering, washing 3 times each time with 2 liters of deionized (DI) water, neutralizing to pH 6, rewashing with DI water and drying in a fluid bed drier at 70° C. for about 45–60 minutes to a moisture of 2.46%.

Process details and product properties are summarized below.

B. The procedure of Part A above was repeated except that after the addition of the caustic but before the addition of the peroxide, 2.25 grams of $MgSO_4 \cdot 7H_2O$ (as a 10% aqueous solution) were added, which provided 1% by weight of the Mg salt based on the dry weight of the hulls or about 0.1% $Mg^{++}$ on the weight of the hulls.

The results from this run are tabulated below.

|  | Without Mg | With Mg |
|---|---|---|
| pH Initial/Final | 11.41/9.80 | 11.42/9.70 |
| Residual $H_2O_2$, % | 22.2 | 29.5 |
| Yield Loss, % | 34.1 | 31.0 |
| Odor | sl. rancidity | no rancidity* |
| Total Ash, % | 1.96 | 2.09 |
| Silica, % | 1.9 | 1.9 |
| Brightness | 78.4 | 79.9 |

*Rancidity was determined by enclosing the product in an airtight glass jar overnight and then having an impartial panel judge the presence or absence of rancidity by smelling the air space when the jar is opened.

EXAMPLE 2

A. Whole oat hulls (227 grams) containing 8.34% $H_2O$ together with enough DI water to provide a total weight of 2267.9 grams were heated in a kitchen pressure cooker at 15 lbs./sq.in. for 15 minutes. The heated mass was cooled to about 25° C., filtered through a 200 mesh stainless steel filter and washed with 4 liters of DI water.

The pressure-cooked and washed hulls were mixed with 65° C. DI water to a total weight of 3673 grams. To this slurry were added 76.1 grams of 29.83% aqueous NaOH, providing 10.9% NaOH based on the original dry weight of the hulls.

After about 2 minutes, 34.2 grams of 33.2% aqueous $H_2O_2$ were added, providing 5.46% $H_2O_2$ on the dry weight of the hulls. The pH was 11.88.

The mixture was held under agitation for 2 hours at 65° C., filtered to remove the insoluble fraction, which was washed 3 times each time with 3 liters of DI water, acidified to pH 6 for 15 minutes, rewashed, recovered and dried.

B. The above procedure was repeated except that after the addition of the caustic but before the addition of the peroxide there were added 90.8 grams of 10% aqueous $MgSO_4 \cdot 7 H_2O$, the quantity of the Mg salt amounting to 4.36% based on the original dry weight of the hulls or 0.43% $Mg^{++}$ ion by weight of the hulls. The pH before the addition of the Mg salt was 11.90.

Process details and product properties are tabulated below:

|  | Untreated Hulls | Treated Hulls | |
|---|---|---|---|
|  |  | Without Mg | With Mg |
| pH Initial/Final | — | 11.88/11.25 | 11.90/10.75 |
| Residual $H_2O_2$, % | — | 6.7 | 33.8 |
| Yield Loss, % | — | 31.0 | 29.5 |
| Odor | — | rancid smell | practically no rancidity |
| Total Ash, % | 6.0 | 2.92 | 1.51 |
| Silica, % | 6.5 | 2.8 | 1.33 |
| Color | tan | white | white |
| Brightness | 57.8 | 66.4 | 70.5 |

EXAMPLE 3

Ground oat hulls (742.35 grams) containing 8.34% $H_2O$ were added to 9250 grams of DI water heated at 65° C. under agitation; pH=6.6.

Next, 285.3 grams of 28.6% NaOH were added to provide 12% NaOH based on the hulls, dry weight; pH=11.97. After 15 minutes, 136.1 grams of a 10% aqueous solution of $MgSO_419\ 7H_2O$ were added to provide 2% of the Mg compound by weight of the dry hulls, or 0.2% Mg ion on the dry weight of the hulls.

Five minutes later, 113.9 grams of 29.88% aqueous $H_2O_2$ were added, providing 5% $H_2O_2$ on the dry weight of the hulls, and the mixture was stirred for 2 hours at 65° C., when the reaction was terminated. The final pH was 10.80.

The reaction mixture was vacuum filtered, and the insoluble material washed 2 times with DI water, acidified to pH 6–7 with 10% aqueous HCl, again washed with DI water and dried in a fluid bed dryer (70° C., 45 to 60 minutes).

The process was repeated 3 times and the 4 lots of dried product were combined.

for comparison, the same set of experiments were run without magnesium under otherwise identical conditions.

| Comparative results follow: | | |
|---|---|---|
|  | Without Mg | With Mg |
| Presence of foam during run | slight | no |
| Residual $H_2O_2$, % | 19.4 | 30.5 |
| Yield Loss, % | 32.8 | 31.3 |
| Dietary Fiber, % | 49.9 | 51.9 |
| Fat Content, % | 0.16 | 0.17 |
| Odor | sl. ranciity | none |
| Total Ash, % | 1.39 | 1.12 |
| Silica Content, % | 0.75 | 0.33 |
| Brightness* | 76.7 | 77.8 |
| Moisture, % | 3.5 | 3.9 |
| Protein, % | 0.9 | 0.8 |

*Hunter Color Difference Meter D-2 ratings.

I claim:

1. An improved process for converting nonwoody lignocellulosic substrates into products digestible by ruminants and ingestible by humans comprising the following steps:
   (a) forming a slurry of the substrate with aqueous alkali in an amount at least sufficient to wet the substrate, the slurry having a pH in the range 10 to 13 and a temperature of about 25° to 100° C., the slurry being substantially free of peroxide;
   (b) maintaining the slurry for a sufficient time under conditions of (a) for the alkali to wet the substrate;
   (c) adding sufficient magnesium compound to provide about 00.5 to 1.0 percent magnesium ions based on the dry weight of the substrate;
   (d) adding a water-soluble peroxide in an amount sufficient to bleach the substrate to the alkaline slurry after or with the addition of the magnesium ions;
   (e) maintaining the substrate in contact with the alkaline peroxide solution at a sufficient temperature, pH and for a time sufficient to produce a substantially bleached, cellulosic fiber; and
   (f) separating the bleached fiber from the alkaline liquid.

2. The process of claim 1 wherein the magnesium compound provides 0.1 to 0.8 percent magnesium ions based on the dry weight of the substrate.

3. The process of claim 1 wherein the magnesium compound provides 0.1 to 0.6 percent magnesium ions based on the dry weight of the substrate.

4. The process of claim 1 wherein the magnesium compounds in step (c) comprise soluble magnesium compounds.

5. The process of claim 1 wherein the magnesium compounds are magnesium sulfate or magnesium chloride.

6. The process of claim 1 wherein the magnesium compound is added after the substrate is wetted but before the addition of peroxide.

7. The process of claim 1 wherein the magnesium compound is dissolved in the peroxide before the peroxide is added to the alkaline slurry.

8. The process of claim 1 wherein the magnesium compound is added simultaneously but separately with the addition of peroxide.

9. The process of claim 1 wherein the substrate comprises the hulls of cereal grains.

10. The process of claim 9 wherein the substrate comprises oat hulls.

11. The process of claim 1 wherein the pH in step (a) is in the range 10.2 to 11.8.

12. The process of claim 11 wherein the pH is in the range 10.8 to 11.2.

13. The process of claim 1 wherein the alkali is sodium or potassium hydroxide or carbonate.

14. The process of claim 13 wherein the alkali is sodium hydroxide.

15. The process of claim 1 wherein the alkali, calculated as sodium hydroxide, is about 5 to 15 percent of the dry weight of the substrate.

16. The process of claim 15 wherein the alkali is about 7 to 12 percent of the dry weight of the substrate.

17. The process of claim 1 wherein the slurry in step (a) has a consistency of about 5 to 30 percent.

18. The process of claim 1 wherein the temperature of step (a) is about 60° to 75° C.

19. The process of claim 18 wherein the temperature of step (a) is about 65° to 70° C.

20. The process of claim 1 wherein the pH of step (e) is about 9.5 to 11.0.

21. The process of claim 20 wherein the pH of step (e) is about 10.0 to 10.5.

22. The process of claim 1 wherein the peroxide added in step (d) is hydrogen peroxide.

23. The process of claim 22 wherein peroxide is about 2 to 15 percent of the dry weight of the substrate.

24. The process of claim 23 wherein peroxide is about 4 to 10 percent of the dry weight of the substrate.

25. The process of claim 24 wherein peroxide is about 5 to 8 percent of the dry weight of the substrate.

26. The process of claim 1 wherein the temperature of step (e) is about 25° to 90° C.

27. The process of claim 26 wherein the temperature of step (e) is about 50° to 85° C.

28. The process of claim 27 wherein the temperature of step (e) is about 65° to 80° C.

29. A process for making a reduced calorie dietary flour comprising blending and milling the product of the process of claim 1 with wheat, rice, barley, rye, millet, oat, corn and other cereal grains to obtain a uniformly distributed mixture of regular flour and dietary flour.

* * * * *